United States Patent [19]

Huybrechts et al.

[11] Patent Number: 4,609,692
[45] Date of Patent: Sep. 2, 1986

[54] LOW TEMPERATURE CURING MAINTENANCE COATINGS COMPRISING (A) EPOXY RESIN (B) POLYAMINE CURING AGENT (C) POLYMER CONTAINING PENDANT AMINOESTER GROUPS AND (D) ORGANIC SOLVENT

[75] Inventors: Jozef T. Huybrechts, Turnhout; Ferdinand F. Meeus, Mechelen, both of Belgium

[73] Assignee: E. I. Du Pont de Nemours and Company, Wilmington, Del.

[21] Appl. No.: 675,555

[22] Filed: Nov. 28, 1984

[51] Int. Cl.$^4$ ............... C08K 3/36; C08K 5/09; C08L 63/00
[52] U.S. Cl. ............... 523/439; 523/400; 523/456
[58] Field of Search ............... 564/160; 523/456, 400, 523/439

[56] References Cited

U.S. PATENT DOCUMENTS

| | | | |
|---|---|---|---|
| 2,795,564 | 6/1957 | Conn et al. | 260/29.6 |
| 2,798,861 | 7/1957 | Segall et al. | 260/45.5 |
| 2,842,459 | 7/1958 | Gollub et al. | 117/72 |
| 2,954,358 | 9/1960 | Hurwitz | 260/29.6 |
| 3,011,909 | 12/1961 | Hart et al. | 117/72 |
| 3,070,564 | 12/1962 | Roeser | 260/33.6 |
| 3,107,226 | 10/1963 | Tonner et al. | 260/23 |
| 3,154,598 | 10/1964 | Vasta | 260/837 |
| 3,196,120 | 7/1965 | McLaughlin et al. | 260/23 |
| 3,215,757 | 11/1965 | Schelbli et al. | 260/837 |
| 3,245,925 | 4/1966 | Watson | 260/20 |
| 3,248,356 | 4/1966 | Snyder | 260/29.6 |
| 3,301,801 | 1/1967 | Gaske et al. | 260/17 |
| 3,305,601 | 2/1967 | Hicks | 260/837 |
| 3,375,227 | 3/1968 | Hicks | 260/47 |
| 3,492,252 | 1/1970 | Euchner et al. | 260/8 |
| 3,509,086 | 4/1970 | Rohrbacher | 260/32.8 |
| 3,538,185 | 11/1970 | Davis et al. | 260/837 |
| 3,544,495 | 12/1970 | Nazy et al. | 260/18 |
| 3,647,765 | 3/1972 | Mortillaro et al. | 260/78 UA |
| 3,758,633 | 9/1973 | Labana et al. | 260/836 |
| 3,776,865 | 12/1973 | Glaser et al. | 260/18 N |
| 3,945,963 | 3/1976 | Levine et al. | 260/29.6 N R |
| 3,954,898 | 5/1976 | Hirota et al. | 260/837 R |
| 3,960,979 | 6/1976 | Khanna | 260/834 |
| 4,018,848 | 4/1977 | Khanna | 260/834 |
| 4,177,178 | 12/1979 | Das et al. | 260/29.40 A |
| 4,192,929 | 3/1980 | Wingfield | 525/110 |
| 4,383,059 | 5/1983 | Brook et al. | 523/412 |
| 4,495,366 | 1/1985 | Ley et al. | 564/160 |
| 4,517,378 | 5/1985 | Vasta | 564/160 |

*Primary Examiner*—Herbert J. Lilling
*Attorney, Agent, or Firm*—Hilmar L. Fricke

[57] ABSTRACT

A low temperature curing coating composition containing 10–80% by weight of binder and 20–90% by weight of an organic solvent in which the binder is
(1) a polymer of polymerized monomers selected from the following group: styrene, methyl methacrylate, an alkyl methacrylate, an alkyl acrylate, each having 2–12 carbon atoms in the alkyl group and the polymer having pendant amino ester groups or hydroxy aminoester groups;
(2) an epoxy resin and
(3) a polyamine curing agent, The composition is used as a primer or topcoating for metal substrates and curings at temperatures of 0° C. to ambient temperatures and at high relative humidity and provides a primer that has excellent adhesion to the substrate and provided a durable, corrosion resistant finish.

16 Claims, No Drawings

LOW TEMPERATURE CURING MAINTENANCE COATINGS COMPRISING (A) EPOXY RESIN (B) POLYAMINE CURING AGENT (C) POLYMER CONTAINING PENDANT AMINOESTER GROUPS AND (D) ORGANIC SOLVENT

BACKGROUND OF THE INVENTION

This invention is related to a coating composition and in particular to a coating composition that cures at low temperatures and high relative humidities.

In northern climates, the season for painting the exterior surfaces of structure such as oil well platforms, bridges, oil or chemical storage tanks, ships and barges is very short. Currently, coating compositions that cure at ambient temperatures of 10° C. and above are used. One such composition is shown in Vasta U.S. Pat. No. 3,558,564 issued Jan. 26, 1971. A coating composition is needed that will cure at temperatures as low as 0° C. which would increase the painting season by several months in northern climates. Such a composition should have the following characteristics: excellent adhesion to the substrate which usually is steel, salt spray resistance, salt water resistance, weather resistance, solvent resistance and excellent durability. Also, the composition should provide a surface to which other coatings can be applied and will adhere.

The novel composition has the aforementioned characteristics.

SUMMARY OF THE INVENTION

A low temperature curing coating composition containing 10-80% by weight of binder and 20-90% by weight of an organic solvent; wherein the binder is
(1) a polymer of polymerized monomers selected from the following group: styrene, methyl methacrylate, an alkyl methacrylate, an alkyl acrylate, each having 2-12 carbon atoms in the alkyl group, and the polymer having pendent amino ester groups or hydroxy amino ester groups.
(2) an epoxy resin and
(3) a polyamine curing agent.

DETAILED DESCRIPTION OF THE INVENTION

The coating composition contains about 10-80% by weight organic solvent. By selecting binder constituents with a relatively low molecular weight, high solids compositions can be formulated having a binder solids content of 50-80% by weight. The binder is a blend of a polymer, an epoxy resin or epoxy novolac resin and a polyamine curing agent. Usually, the composition contains pigments in a pigment to binder weight ratio of about 20:100 to 400:100.

One particular advantage of the composition is that it cures at temperatures as low as 0° C. to a tack free state in about one hour and fully cures at these temperatures in about 24 hours. Curing is substantially faster at temperatures above 0° C. Under normal temperature conditions "pot life" of the composition is at least ten hours which is adequate to apply the composition.

The polymer is composed of polymerized monomers of methyl methacrylate, styrene, alkyl methacrylate, alkyl acrylate or mixtures thereof, each having 2-12 carbon atoms in the alkyl group, and has pendent amino ester groups or hydroxy amino ester groups. The polymer has a number average molecular weight of about 1,500-100,000 and preferably about 10,000 to 20,000.

Molecular weight is determined by gel permeation chromatography using polystyrene as the standard.

One method for preparing the acrylic polymer is to polymerize monomers of methyl methacrylate, styrene, alkyl methacrylate, alkyl acrylate or mixtures thereof and an unsaturated acid functional monomer such as methacrylic acid or acrylic acid and then post react the carboxyl groups of the resulting polymer with an alkylene imine to form pendent amino ester groups from the backbone of the polymer.

The polymerization of the monomers to form the polymer is carried out by conventional techniques in which the monomers, solvents and polymerization catalyst are charged into a polymerization vessel and reacted at about 50°-250° C. for about 0.5-6 hours to form the polymer.

Typical polymerization catalysts that are used are azopolymerization catalysts such as azobisisobutyronitrile, azo-bis(gamma dimethyl valeronitrile), and the like or peroxy polymerization catalysts such as benzoyl peroxide.

Typical solvents used are toluene, xylene, ethyl acetate, acetone, methyl ethyl ketone, methyl isobutyl ketone, ethanol, isopropanol and other aliphatic, cycloaliphatic and aromatic hydrocarbon esters, ethers, ketones and alcohols as are conventionally used.

One preferred acrylic polymer contains about 20-45% by weight methyl methacrylate, 20-40% of styrene, 25-45% by weight of butyl methacrylate and 0.1-5% by weight of methacrylic acid which polymer has been post reacted with an alkylene imine such as propylene imine to provide amino ester groups pendent from the carbon-carbon polymer backbone of the formula

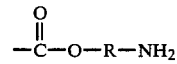

where R is an alkylene group having 2-3 carbon atoms.

In an alternative method for preparing the polymer, monomers of methyl methacrylate, styrene alkyl methacrylate, alkyl acrylate or mixtures thereof and glycidyl methacrylate or glycidyl acrylate are polymerized using the above solvents, polymerization catalyst and procedure. The resulting polymer and ammonia or an ammonium compound are charged into a pressure vessel and heated to about 80°-150° C. and maintained at a pressure of about 14-35 kilograms per square centimeter (approximately 200-500 pounds per square inch) for about 1 to 8 hours or until all of the glycidyl groups have been reacted with ammonia or the ammonium compound. After the reaction of ammonia with the glycidyl groups of the polymer is completed, excess free ammonia is vacuum stripped off. The resulting polymer has hydroxy amino ester groups pending from the carbon-carbon backbone of the polymer and have the following formulas:

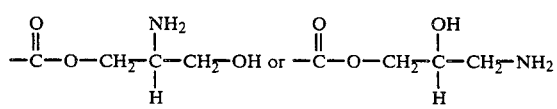

The monomers used to form the polymer are styrene, methyl methacrylate, alkyl methacrylates having 2-12 carbon atoms in the alkyl group such as ethyl methacrylate, propyl methacrylate, isopropyl methacrylate, butyl methacrylate, isobutyl methacrylate, pentyl methacrylate, hexyl methacrylate, ethyl hexyl methacrylate, nonyl methacrylate, decyl methacrylate, lauryl methacrylate and the like; alkyl acrylates having 2-12 carbon atoms in the alkyl group such as methyl acrylate, ethyl acrylate, propyl acrylate, butyl acrylate, isobutyl acrylate, pentyl acrylate, hexyl acrylate, ethyl hexyl acrylate, nonyl acrylate, decyl acrylate, lauryl acrylate and the like, acrylic acid and methacrylic acid. Less reactive acid unsaturated monomers can be used such as itaconic acid, fumeric acid and maleic acid. Glycidyl functional unsaturated monomers can be used. In the alternative method for preparing the polymer, glycidyl acrylate or methacrylates are used.

In addition to the aforementioned monomers, the following monomers can be used to form the polymer: vinyl toluene, vinyl oxazoline esters, maleate esters such as diethyl maleate, fumurate esters such as dimethyl fumurate.

The monomer of the polymer are chosen to provide for a desired glass transition temperature and desired flexibility of the finish formed from the coating composition.

An epoxy resin that can be used in the composition has the formula

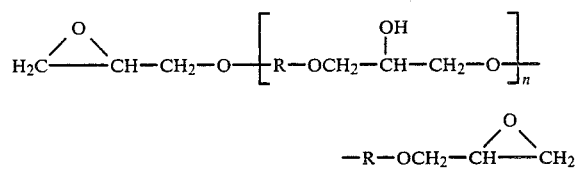

where n is a positive integer of about 0.5 to 4. Preferably, the epoxy resin is the polymerization product of epichlorohydrin and bisphenol A. With this preferred epoxy resin, R in the above formula is

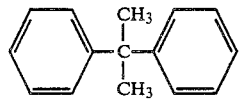

Typical of these preferred epoxy resins are "Epon" 828 having an equivalent weight of about 185-192 manufactured by Shell Chemical Company and D.E.R. 331 having an equivalent weight of about 182-190 manufactured by The Dow Chemical Company. Another preferred epoxy resin is "Epon" 1001 having an equivalent weight of about 450-550. The equivalent weight is the grams of resin that contain one gram of epoxide.

An epoxy novolac resin that can be used in the composition has the formula

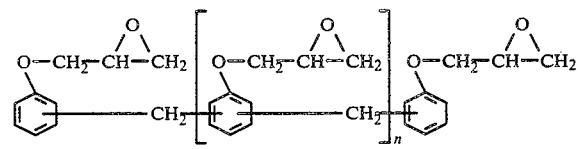

where n is a positive integer of about 0.2-2. Preferred epoxy novolac resins are D.E.N. 431 where n has an average value of 0.2 and has an equivalent weight of 172-179, D.E.N. 438 where n has an average value of 1.6 and has an equivalent weight of 176-181 and D.E.N. 439 where n has an average value of 1.8 and has an equivalent weight of 191-210. These resins are manufactured by the Dow Chemical Company.

The coating composition contains an amine curing agent of the formula

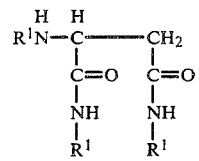

where $R^1$ is $R_2 NH_2$ and $R_2$ is an aliphatic or cycloaliphatic hydrocarbon radical The curing agent is prepared by reacting 3 moles of an aliphatic or cycloaliphatic polyamine with 1 mole of a dialkyl maleate. Reaction temperatures of about 100°-170° C. are used for about 1-6 hours to form the curing agent while an alkanol resulting from the reaction is removed.

Typical polyamines used to form the curing agent are isophorone diamine which is 3-aminoethyl-3,5,5-trimethyl cyclohexylamine, hexamethylene diamines, ethylene diamine, 1,4-cyclohexane bis(methylamine), 1,2 diaminopropane, propylene diamine, diethyl ether diamine and trimethyl hexamethyl methylene diamine. Typical dialkyl maleates are dimethyl maleate, diethyl maleate, ethyl methyl maleate, dipropyl maleate, dibutyl maleate and the like.

One preferred curing agent is the reaction product of isophorone diamine and dimethyl maleate and has the following structural formula:

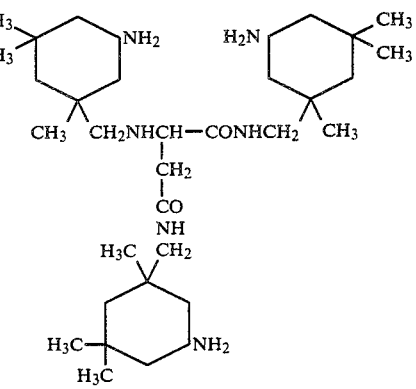

Preferably, the binder of the coating composition consists essentially of 20-60% by weight of the polymer, 15-45% by weight of epoxy resin or epoxy novolac resin, 5-25% by weight of the polyamine curing agent.

To provide for rapid curing at low temperatures, an aromatic alcohol is added in amounts of about 1-10% by weight, based on the weight of the binder. Typical aromatic alcohols that can be added are phenol, nonyl phenol, tris(dimethylamino methyl)phenol, combinations of nonyl phenyl and an amine such as triethylamine or diethanolamine. Tris(dimethylamino methyl)phenol is preferred to provide a high quality coating composition.

About 0.5–5% by weight, based on the weight of the binder, of a chloride ion scavanger can be added to the composition. The metal ion of the scavanger reacts with an residual chlorides which may be on a substrate being painted thereby reducing corrosion of the substrate. For example, the steel of an oil well platform in the ocean is covered with a salt residue. If the salt on the surface of the steel is not bound in some manner, corrosion starts and rapidly accelerates. Typical chloride ion scavangers that can be used are as follows: lead naphthenate which is preferred, lead tallate and lead octate.

Often the composition is applied over substrates that are moist or wet. To insure thorough wetting of the surface and penetration to the metal about 0.1–3% by weight, based on the weight of the binder, of a wetting agent is added to the composition. Typical silicone wetting agents are as follows: polydimethyl siloxane, oxyethylene methyl siloxanes such as "Silwet" L-77 and "Silwet" L-7607 made by Union Carbide and other condensation products of ethylene oxide and alkyl siloxane. Other wetting agents can be used as acrylate polymer flow control agents, fluoro chemical surfactants such as FC 430 and FC 431 manufactured by 3M. For rheology control about 1–10% by weight, based on the weight of the binder, of hydrophobic fumed silica can be added. The addition of rheology control agents allows for the application of thick coatings such as 200–400 microns dry thickness without sagging of the coating.

Generally, the composition is pigmented. The pigments are dispersed in the composition by conventional techniques such as ball milling, sand grinding, attritor grinding, Dynomill grinding and the like. Typical pigments that can be used are as follows: metallic oxides such as titanium dioxide, iron oxide, zinc oxide, chromate pigments such as lead chromate, filler pigments such as barytes, talc, china clay and the like, phosphate pigments such as zinc phosphate, carbon black, black molybdate oxide pigments, barium metaborate pigments, Bentone pigments and the like.

One particularly useful combination of pigments for a corrosion resistant primer is the following: titanium dioxide, Bentone, talc, carbon black and zinc phosphate.

The composition generally is in two components. Component A contains epoxy resin and pigments. Component B contains the polymer the polyamine curing agent, and pigments and optionally a phenol compound. The two components are blended together a relatively short time before application. Pot life of the composition at temperature of 0° C. is expected to be at least two days and at 25° C. is about 24 hours.

Solvents used in the composition are chosen to provide curing at low temperatures and have a high evaporation rate at these low temperatures. Typically useful solvents are as follows: alcohols such as methanol, ethanol, propanol, isopropanol, benzyl alcohol, acetates such as ethyl acetate, toluene, xylene, and the like.

The coating composition can be applied by conventional methods such as spraying, electrostatic spraying, airless spraying, brushing, dipping, flow coating and the like. The composition can be applied to a variety of substrates such as steel, iron, painted steel, treated steel such as phosphatized steel, aluminum, plastics, wood, glass and the like. The composition can be fully cured as demonstrated by resistance to solvents such as methyl ethyl ketone at about 0° C. in about 24 to 48 hours. Higher curing temperatures reduce curing time. The resulting finish has excellent adhesion to the substrate, good corrosion resistance, is weatherable and durable and with proper pigmentation can be used as a primer or as a topcoat. The composition is particularly useful as an overcoat primer for steel substrates coated with an inorganic zinc primer.

The composition is particularly useful in cold climates to pain oil well platforms in the ocean, oil rigs on land, ships, barges, oil and chemical tanks, bridges, oil refineries and the like. The composition can be modified for use for coating or refinishing trucks and automobiles.

The following example illustrates the invention. All parts and percentages are on a weight basis unless otherwise indicated. Molecular weights are determined by gel permeation chromatography using polystyrene as a standard.

EXAMPLE 1

An iminated acrylic polymer solution was prepared by charging the following constituents into a 20 liter reaction vessel equipped with a stirrer, thermometer, a reflux condenser and a heating source:

|  | Parts by Weight |
|---|---|
| Portion 1 | |
| Methacrylic acid monomer | 180 |
| Styrene monomer | 1600 |
| Butyl methacrylate monomer | 1800 |
| Methyl methacrylate monomer | 1600 |
| Ethyl acetate | 2090 |
| Toluene | 2510 |
| Portion 2 | |
| "Trigonox" 21 S (t-butyl peroxy-2-ethylhexoate) | 20 |
| Toluene | 180 |
| Portion 3 | |
| Methylmethacrylate monomer | 800 |
| Styrene monomer | 800 |
| Butyl methacrylate monomer | 800 |
| Methacrylic acid monomer | 180 |
| "Trigonox" 21 S (described above) | 200 |
| Toluene | 400 |
| Portion 4 | |
| Ethyl acetate | 100 |
| Portion 5 | |
| Ethyl acetate | 600 |
| Portion 6 | |
| Propylene imine | 240 |
| Ethyl acetate | 160 |
| Portion 7 | |
| Ethyl acetate | 140 |
| Total | 14,000 |

Portion 1 is charged into the reaction vessel and heated to its reflux temperature of about 100° C. Portion 2 is added and the resulting reaction mixture is held at its reflux temperature for 15 minutes. Portion 3 is premixed and then added to the reaction mixture as follows: 30% of Portion 3 was added over a 15 minute period, 50% was added over a 50 minutes period and the remaining 20% was added over an 80 minute period. Portion 4 was added and the reaction mixture was held at its reflux temperature for 90 minutes. Portion 5 was added and the reaction mixture cooled to 40° C. Portion 6 then was added over a 45 minute period and heated to about 75° C. and held at this temperature for 5 hours until the acid number of the reaction was less than 5. Portion 7 then was added.

The resulting polymer solution had a solids content of about 60%, a Gardner Holdt viscosity measured at 60° C. was about Z3 and the polymer had an acid number of 3.2, an amine value of 18.5 and a number average molecular weight of about 14,000 and a weight average molecular weight of about 34,500. Free propylene imine was less than 50 parts per million.

A polyamine activator solution was prepared by charging the following constituents into a reaction vessel equipped with a stirrer, water separator, packed column, thermometer and condensor:

|  | Parts by Weight |
|---|---|
| Portion 1 | |
| Dimethylmaleate | 2441 |
| Portion 2 | |
| Isophorone diamine | 8644 |
| Portion 3 | |
| Xylene | 1333 |
| Methoxy Propanol | 4000 |
| Isobutanol | 1333 |
| Total | 17,751 |

Portion 1 was charged into the reaction vessel and heated to 120° C. and was blanketed with nitrogen. Portion 2 was added over a 3 hour period while maintaining the temperature of the resulting reaction mixture at 120° C. The temperature then was raised gradually to a maximum temperature of 170° C. while 1085 parts methanol were stripped off. Portion 3 was then added and the reaction mixture cooled to ambient temperature.

The resulting solution has a solids content of 60%, a Gardner Holdt viscosity measured at 25° C. of W+⅓ and an amine value of 359.

Paint Formulation I

A paint was prepared by making components AI and BI and then mixing these components together.

Component AI was prepared by charging the following constituents into a Dyno mill and ground until a particle size of about 10-15 microns is achieved and then removed and filtered:

|  | Parts by Weight |
|---|---|
| "Epon" 1001 epoxy resin solution (75% solids solution in xylene of an epoxy resin of bisphenol A and epichlorohydrin having an epoxide equivalent weight of 450-550 and a Gardner Holdt viscosity measured at 25° C. and 40% solids of D-G) | 17.00 |
| Bentone 38 pigment (organic derivative of magnesium montmorillonite) | 1.00 |
| Isopropanol | 1.00 |
| Talc pigment | 13.00 |
| Red oxide pigment | 20.00 |
| Zinc phosphate pigment | 16.00 |
| Toluene | 16.00 |
| Ethyl acetate | 15.99 |
| Flow agent (Baysilon ol-polydimethyl siloxane) | 0.01 |
| Total | 100.00 |

Component BI was prepared by grinding the following constituents in a Dyno mill using the above procedure:

|  | Parts by Weight |
|---|---|
| Iminated Acrylic Polymer solution (prepared above) | 55.0 |
| Polyamine activator solution (prepared above) | 8.0 |
| Bentone 38 pigment (described above) | 6.0 |
| Isopropanol | 1.0 |
| Talc pigment | 4.0 |
| DMP 30 [tris(dimethylamino methyl)-phenol] | 1.5 |
| Toluene | 12.0 |
| Ethyl acetate | 12.5 |
| Total | 100.0 |

100 parts of Component AI were thoroughly blended with 59 parts of Component BI to form Paint Formulation I. The resulting paint was reduced to a spray viscosity with toluene and sprayed by an airless spray technique onto cold roll steel panels and sand blasted steel panels to a dry film thickness of 200-400 microns. Ambient air temperature was about 0°-5° C. The panels dried to a tack free state in about 1 hour without sagging or running of the paint.

A coated cold roll steel panel and a coated sand blasted steel panel were immersed in a sea water for 200 hours. No corrosion failure was noted.

One set of coated cold roll steel and coated sand blasted steel panels were recoated with an acrylic urethane composition 1 hour after the initial spray application of the paint; a second set 3 hours after application and a third set 3 weeks after application. In each case the acrylic urethane composition had excellent adhesion to the painted steel substrate.

The paint formulation was applied to the exterior of an off shore steel oil well platform which had been sand blasted located in the North Sea. The paint dried to a tack free state in about 1 hour and was later coated with an acrylic urethane composition. The resulting painted surface had excellent corrosion and weather resistance.

EXAMPLE 2

Paint Formulation II

A paint was prepared by making Components AII and BII and then mixing these components together.

Component AII was prepared by charging the following constituents into a Dyno mill and grinding to a fineness of about 10-15 microns and then removing and filtering the resulting composition:

|  | Parts by Weight |
|---|---|
| "Epon" 828 epoxy resin (a liquid epoxy resin of Bisphenol A and epichlorohydrin having an epoxide equivalent weight of 185-192 and a viscosity measured at 25° C. of 11,000-15,000 centipoises) | 15.0 |
| Toluene | 15.0 |
| Talc pigment | 15.0 |
| Red iron oxide pigment | 20.0 |
| "Nalzin" 2(Zinc hydroxyphosphite pigment from NL Chemicals) | 15.0 |
| "Aerosil" R 972 (hydrophobic fumed silica) | 1.2 |
| Ethyl Acetate | 18.7 |
| Modaflow (polyacrylate flow control agent) | 0.1 |
| Total | 100.0 |

Component BII was prepared by grinding the following constituents in a Dyno mill using the above procedure:

| | Parts by Weight |
|---|---|
| Iminated Acrylic Polymer Solution (prepared in Example 1) | 50 |
| Polyamine activator solution (prepared in Example 1) | 25 |
| Bentone 34 pigment (dimethyl octadecyl ammonium montmorillonite) | 3 |
| Talc pigment | 5 |
| Butanol | 2 |
| DMP-30 (described in Example 1) | 1 |
| Toluene | 7 |
| Ethyl acetate | 7 |
| Total | 100 |

100 parts of Component AII were thoroughly blended with 52 parts of Component BII to form Paint Formulation II. The resulting paint was reduced to a spray viscosity and sprayed onto cold roll steel panels and sand blasted steel panels. Ambient temperature was about 0°-5° C. The panels dried to a tack free state in about 1 hour.

As in Example 1, coated cold roll steel and sand blasted steel panels were immersed in sea water for 200 hours and no corrosion failure was noted.

As in Example 1, the coated panels were recoated 1 hour, 3 hours and 3 weeks after initial application with an acrylic urethane composition which has excellent adhesion to the painted substrate.

Also, application of Paint Formulation II was made to an off-shore steel oil well platform in the North Sea and the paint dried to a tack free state in 1 hour and was later coated with an acrylic urethane composition and the resulting finish has excellent corrosion and weather resistance.

We claim:

1. A coating composition comprising 10–80% by weight of binder and 20–90% by weight of an organic solvent; wherein the binder consists essentially of about
   (1) 20–60% by weight, based on the weight of the binder, of a polymer consisting essentially of polymerized monomers selected from the group consisting of styrene, methyl methacrylate, an alkyl methacrylate, an alkyl acrylate, each having 2–12 carbon atoms in the alkyl group, and said polymer having pending from the carbon atoms of the polymer backbone aminoester groups of the formula

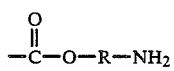

where R is an alkylene group having 2–3 carbon atoms or hydroxyamino ester groups of the formula

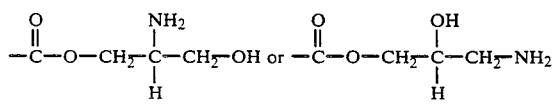

and the polymer having a number average molecular weight of about 1,500–100,000 determined by gel permeation chromatography using polystyrene as a standard;
   (2) 15–45% by weight, based on the weight of the binder, of an epoxy resin selected from the group consisting of an epoxy resin of the formula

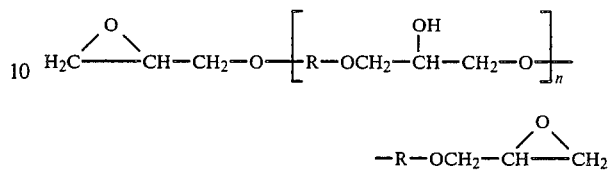

where R is an aromatic radical and n is a positive integer of about 0.5 to 4 or an epoxy novolac resin of the formula

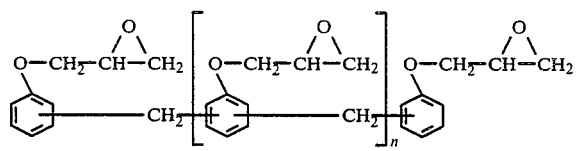

where n is a positive integer of about 0.2–2; and
   (3) 5–25% by weight, based on the weight of the binder, of a polyamine curing agent of the formula

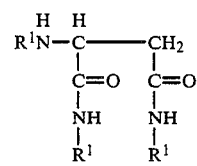

where $R^1$ is

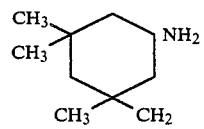

2. The coating composition of claim 1 containing about 1–10% by weight, based on the weight of the binder, of an aromatic alcohol.

3. The coating composition of claim 2 in which the aromatic alcohol is tris(dimethylamino methyl)phenol.

4. The coating composition of claim 1 containing pigment in a pigment to binder weight ratio of about 20:100 to 400:100.

5. The coating composition of claim 1 in which the acrylic polymer consists essentially of styrene, methyl methacrylate, alkyl methacrylate, an alkyl acrylate each having 2–8 carbon atoms in the alkyl group and methacrylic acid; said polymer reacted with an alkylene imine to provide amino ester groups pendent from the carbon-carbon polymer backbone of the formula

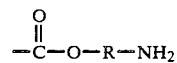

where R is an alkylene group having 2–3 carbon atoms.

6. The coating composition of claim 1 in which the polymer consists essentially of styrene, methyl methacrylate, alkyl methacrylate an alkyl acrylate, each having 2-8 carbon atoms in the alkyl group and glycidyl methacrylate; said polymer being reacted with ammonia or an ammonium compound to provide hydroxy amino ester groups pendent from the carbon-carbon polymer backbone of the formula

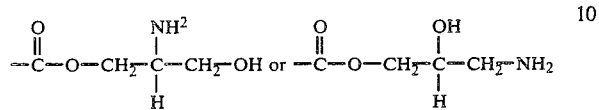

7. The coating composition of claim 1 in which R is

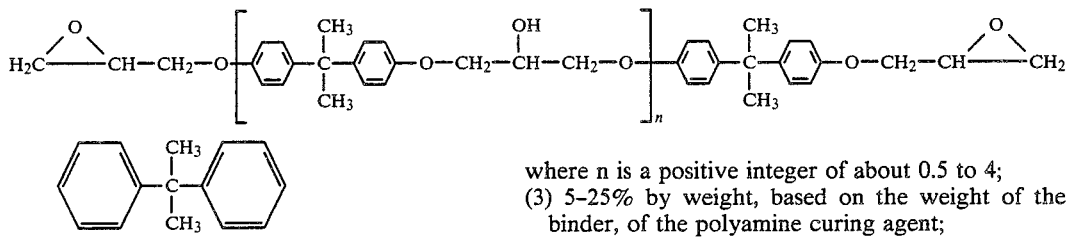

8. The coating composition of claim 1 containing about 0.1-5% by weight, based on the weight of the binder, of a chloride scavenger.

9. The coating composition of claim 8 in which the chloride scavenger is lead naphthenate.

10. The coating composition of claim 1 containing about 0.1-3% by weight, based on the weight of the binder, of a wetting agent.

11. The coating composition of claim 1 containing about 1-10% by weight, based on the weight of the binder, of hydrophobic fumed silica.

12. The coating composition of claim 1 in which the binder consists essentially of about
(1) 20-60% by weight, based on the weight of the binder, of a polymer consisting essentially of 20-45% by weight, based on the weight of the polymer, of methyl methacrylate, 20-40% by weight, based on the weight of the polymer, of styrene, 25-45% by weight, based on the weight of the polymer, of butyl methacrylate, 0.1-5% by weight, based on the weight of the polymer, of methacrylic acid, said polymer reacted with propylene imine to provide amino ester group pendent from the carbon-carbon polymer backbone of the formula

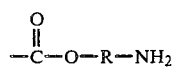

where R is an alkylene group of 3 carbon atoms; and wherein the polymer has a number average molecular weight of about 10,000-20,000;
(2) 15-45% by weight, based on the weight of the binder, of an epoxy resin of the formula

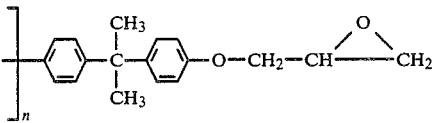

where n is a positive integer of about 0.5 to 4;
(3) 5-25% by weight, based on the weight of the binder, of the polyamine curing agent;
said coating composition containing pigment in a pigment to binder weight ratio of about 20:100 to 400:100.

13. The coating composition of claim 12 containing 1-10% by weight of tris(dimethyl amino methyl)phenol.

14. The coating composition of claim 12 containing about 0.1-3% by weight, based on the weight of the binder, of a wetting agent.

15. The coating composition of claim 12 containing about 1-10% by weight, based on the weight of the composition, of hydrophobic fumed silica.

16. A two-component composition, wherein the two components are mixed together to form the composition of claim 1 wherein the components comprise
component (1) a solution of the polymer and the polyamine curing agent; and
component (2) comprises the epoxy resin.

* * * * *